United States Patent
Kremer et al.

(10) Patent No.: US 12,493,547 B2
(45) Date of Patent: Dec. 9, 2025

(54) DYNAMIC MEMORY ALLOCATION USING A SHARED FREE LIST

(71) Applicant: Mellanox Technologies, Ltd., Yokneam (IL)

(72) Inventors: Gil Kremer, Nof HaGalil (IL); Roee Moyal, Yoqneam Ilit (IL); Igor Voks, Kfar Yehoshua (IL); Liel Peled, Haifa (IL); Eliel Peretz, Kiryat Motzkin (IL); Ariel Shahar, Jerusalem (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/330,007

(22) Filed: Jun. 6, 2023

(65) Prior Publication Data
US 2024/0411680 A1  Dec. 12, 2024

(51) Int. Cl.
*G06F 12/02* (2006.01)

(52) U.S. Cl.
CPC ...... *G06F 12/023* (2013.01); *G06F 2212/154* (2013.01)

(58) Field of Classification Search
None
See application file for complete search history.

(56) References Cited

U.S. PATENT DOCUMENTS

| | | | |
|---|---|---|---|
| 10,204,046 B1 * | 2/2019 | Peer | G06F 12/0802 |
| 2002/0059435 A1 * | 5/2002 | Border | H04L 49/9094 709/228 |
| 2004/0230737 A1 * | 11/2004 | Burton | G06F 12/0871 711/216 |
| 2014/0025919 A1 * | 1/2014 | Stark | G06F 13/1615 711/206 |
| 2018/0218023 A1 * | 8/2018 | Fanghaenel | G06F 16/2343 |
| 2018/0351780 A1 * | 12/2018 | Atanasov | H04L 69/40 |
| 2022/0206961 A1 * | 6/2022 | Lempel | G06F 12/1441 |

FOREIGN PATENT DOCUMENTS

WO   WO-2013163008 A1 * 10/2013  ............. G06F 12/02

OTHER PUBLICATIONS

Platz et al. "Practical Concurrent Unrolled Linked Lists Using Lazy Synchronization." 2014. Springer. OPODIS 2014. pp. 388-403.*

* cited by examiner

*Primary Examiner* — Nathan Sadler
(74) *Attorney, Agent, or Firm* — Lowenstein Sandler LLP

(57) ABSTRACT

Apparatuses, systems, and techniques for dynamic memory allocation using a shared free list. A user tag is received, and a hashed user tag is generated. A first reference to an entry in a second data structure is identified in a first data structure using the hashed user tag. The entry includes multiple user tags. Responsive to determining that the multiple user tags do not include the user tag, a memory address is identified in a third data structure. The memory address is removed from the third data structure. Memory is allocated for a user context associated with the user tag at the memory address. The user tag is added to the second data structure.

20 Claims, 6 Drawing Sheets

DYNAMIC MEMORY ALLOCATION USING A SHARED FREE LIST

TECHNICAL FIELD

At least one embodiment of the present disclosure pertains to processing resources used to perform and facilitate memory allocation. For example, one embodiment pertains to processors or computing systems that dynamically allocate memory using a shared free list.

BACKGROUND

In many systems, devices connect to a communication network over a network interface to exchange data between two or more devices connected through the network. A high number (e.g., trillions) of possible network transactions may occur over the network interface.

BRIEF DESCRIPTION OF THE DRAWINGS

The present disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
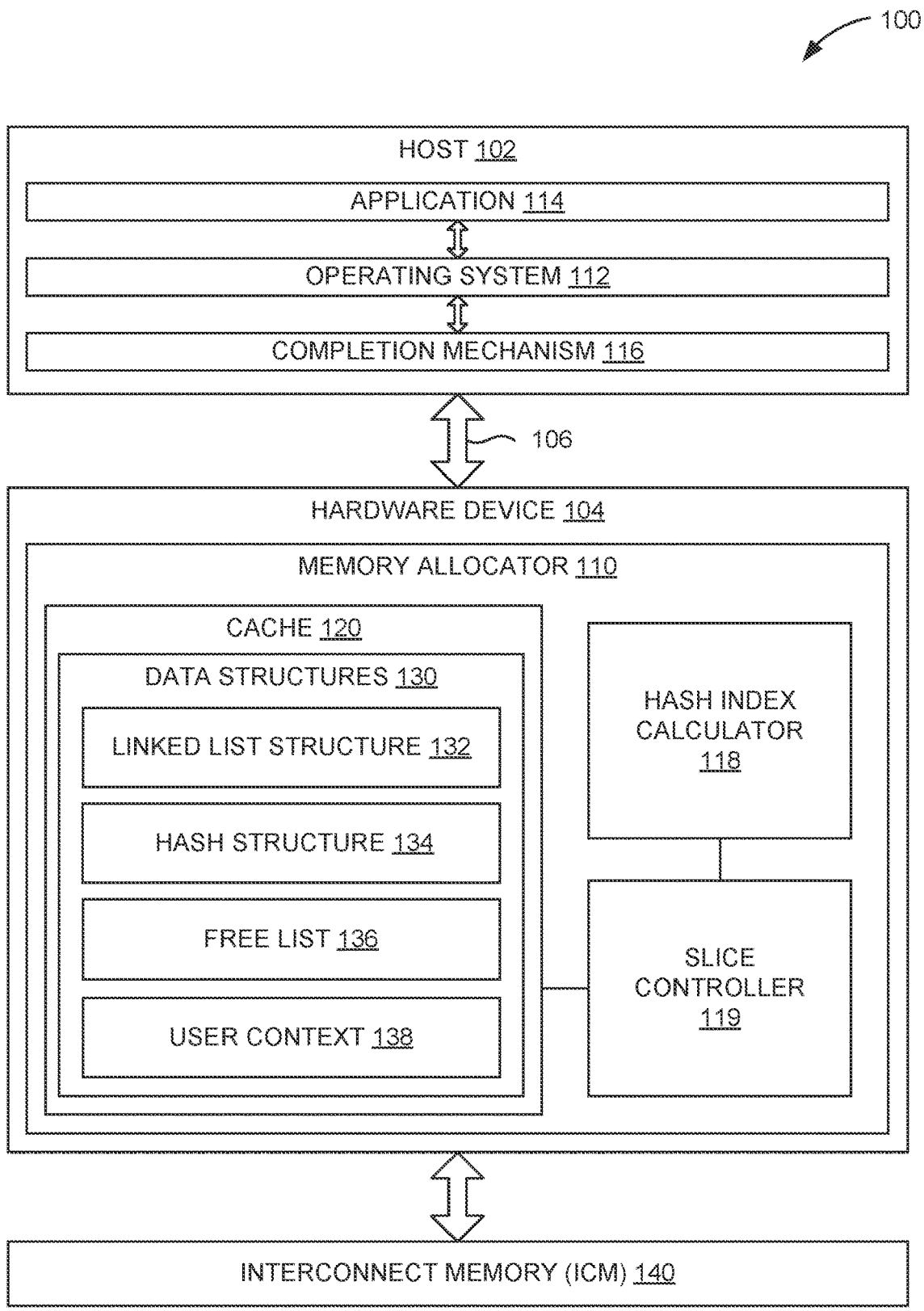
FIG. 1 is a block diagram illustrating an example system, in accordance with at least one embodiment of the present disclosure.

A network transaction is an exchange of data between two or more nodes (e.g., devices, systems, servers, etc.) over a network. A network transaction includes a request-response cycle in which a client device sends a request to a server, and the server processes the request and sends back a response. For example, a user may transmit (e.g., via a client device) a request for a webpage from a server, and the server may respond with the requested data. When two or more devices communicate over a network, they exchange data (e.g., packets) that contain information being exchanged over the network. Recent developments have improved performance and throughput of data over a network interface, but, in some instances, the local interconnect (e.g., peripheral component interconnect (PCI)) bus may provide limited bandwidth for data transfer between the host and the network interface. In some instances, data may be cached on the network interface to reduce the local interconnect traffic.

Conventional methods for caching data on the network interface include allocating a fixed amount of memory on a network device (e.g., a network interface card (NIC)) based on an expected workload of an application. The amount of memory may be determined by analyzing network traffic and estimating the size and frequency of data that is likely to be cached. This memory may be dedicated exclusively for caching purposes. Because the amount of memory allocated for caching fails to account for changing workloads of the network application, the amount of memory allocated may be unsuitable for a given workload of the network application. For example, if the amount memory allocated for caching is too small, it may lead to frequent cache misses, cache thrashing, and reduced overall cache performance. If the amount memory allocated for caching is too big, memory resources may be unnecessarily wasted.

Aspects and embodiments of the present disclosure address the above deficiencies by dynamically allocating memory for a given network transaction using a free list of unused memory addresses shared by multiple network transactions occurring over the network. When the given network transaction is completed, memory allocated from the given memory transaction may be released and reused by subsequent network transactions. Thus, a network device may dynamically allocate memory resources for caching data associated with network transactions.

The hardware device may manage network transactions by utilizing a cache that is configured to store a set of data structures, such as a hash data structure, a linked list data structure, and the free list, as described in more detail below. Each network transaction may include a user tag that is an identifier of a user context. A user context may refer to contextual data that contains information regarding a particular network transaction. For example, the contextual data may include data such as the source and destination IP addresses, port numbers, protocol types, packet headers, and other metadata that can help identify the particular network transaction. It can be noted that the user context can include other data to serve an operation. In another example, the user context can include information to create a Completion Queue Entry (CQE) of a message that arrive out of order. Information to create the CQE can include a message identifier, a current status of the operation, and the like. In another example, the user context can contain relevant information to perform an atomic operation (e.g., read, write, lock, compare-and-swap, etc.). The relevant information to perform the atomic operation may include and address of a memory location or resources to be accessed, the type of atomic operation to be performed, and the like.

The set of data structures may include a hash data structure, a linked list data structure, and a free list. Each entry of the hash data structure may be accessed by a respective hashed user tag. Each entry of the hash data structure may hold a reference (e.g., a pointer) to a linked list stored within the linked list data structure. Each entry of the linked list data structure may include a linked list of user tags. Each entry of a given linked list stored within the linked list data structure may store one or more user tags that share the same hashed user tag. For example, the given linked list may include a first user tag and a second user tag that both have the same hashed user tag. The free list can be a queue of unused memory addresses shared between network entities (e.g., network transactions) processed by the hardware device. For example, the hardware device may obtain a memory address from the free list and allocate memory linked to user tags and associated to user contexts at the obtained memory address.

In various embodiments, by way of example, a hardware device according to the present disclosure may receive a request to lock or reserve a particular region of memory within a cache for a particular network transaction. In at least one embodiment, the lock request may include a user tag that is an identifier of a user context. The hardware device may perform a hash operation on the user tag to generate a hashed user tag. The hardware device may identify an entry in the hash data structure corresponding to the hashed user tag. The identified entry may include a reference (e.g., a pointer) to a head (i.e., a first entry) of a linked list store within the linked list data structure. The hardware device may traverse the linked list to determine whether the received user tag is stored within the linked list. Responsive to determining that the user tag is not stored within the linked list, the hardware device may insert the user tag into the linked list and allocate memory for the user tag and the corresponding user context at a memory address received from the free list. The hardware device may place a lock on the linked list to prevent subsequent lock requests from accessing and/or writing to the linked list until the lock is released. Additionally, the hardware device may provide the host with a reference (e.g., a pointer) to the user context. Responsive to receiving a release request from the host, the hardware device may release the lock, deallocate the memory for the user tag and corresponding user context, and return the memory address to the free list for reuse by subsequent network transactions. By allocating memory for a given network transaction, and releasing the memory when the given network transaction is finished, the system can dynamically allocate memory for caching data associated with network transactions rather than allocating a fixed amount memory for a cache. Such caching can reduce traffic across a peripheral component interconnect between a host and the network interface, increasing an overall throughput of the system. Additionally, dynamic memory allocation can utilize memory more efficiently by allocation and deallocating memory according to currently working connections instead of allocating a fixed amount of memory for all connections (e.g., potential connections).

In at least one embodiment, the free list may be a last-in, first-out (LIFO) queue where the newest (last) index of the queue is processed first. When the hardware device allocates memory for a user context, the newest memory address is popped off the free list and provided to the hardware device. When the memory allocator deallocates memory for a user context, the memory address is pushed back onto the free list. Because the free list is a LIFO queue of unused memory addresses, the same memory address will be popped from the queue and pushed onto the queue as the hardware device processes multiple lock requests and release requests. This memory address reuse can reduce memory fragmentation and improve memory utilization. By avoiding the creation of new memory blocks every time a user context is added to the cache, the cache can make more efficient use of available memory, leading to faster overall performance and improved memory utilization.

FIG. 1 is a block diagram illustrating an example system 100, in accordance with at least one embodiment of the present disclosure. System 100 includes a host 102 and a hardware device 104. In at least one embodiment, host 102 is a computer system and may include a central processing unit (CPU), random-access memory (RAM), data storage, input/output peripherals, and other components. An example computer system is described in further detail with respect to FIG. 6. Hardware device 104 may be another computer system, a central processing unit, a graphics processing unit (GPU), a data processing unit (DPU), a network interface controller (NIC), a host channel adapter (HCA), a converged network adapter (CNA) or other peripheral. Host 102 and hardware device 104 are connected by communication channel 106. Communication channel 106 may include any networking, switching, or other communication protocols and buses alone or in combination, such as PCIe, NVIDIA NVLINK, InfiniBand, Ethernet, Fibre Channel, a cellular or wireless communication network, a ground referenced signaling (GRS) link, the Internet, combinations thereof (e.g., Fibre Channel over Ethernet), or variants thereof, for example.

In at least one embodiment, system 100 corresponds to one or more of a personal computer (PC), a laptop, a workstation, a tablet, a smartphone, a server, a collection of servers, a data center, or the like. In at least one embodiment, host 102 and hardware device 104 are discrete components that makeup system 100. In at least one embodiment, host 102, hardware device 104, and communication channel 106 are part of a monolithic system 100, such as a system-on-chip (SoC).

In at least one embodiment, host 102 may include an operating system (OS) 112, and an application 114. OS 112 may mediate between application 114 and hardware device 104. OS mediation may be accomplished via drivers, libraries, kernel modules, application programming interfaces (APIs), or similar. In at least one embodiment, OS 112 may be absent, and the application may directly communicate with hardware device 104 without OS mediation. In at least one embodiment, host 102 and application 114 are synonymous (e.g., an application container), and application 114 manages communication with hardware device 104. In at least one embodiment, OS 112 and application 114 are synonymous (e.g., a kernel module or driver is the application). Various embodiments may utilize any combination of the above host architectures and communication methods.

Completion mechanism 116 may enable communication from hardware device 104 to host 102 regarding lock requests and release requests issued from host 102. Completion mechanism 116 may be a return value from a function or API, a synchronous or asynchronous callback, a message-passing system (e.g., pipes, FIFOs, or similar inter-process communication), a block or character device, a hardware interrupt, a section of shared memory or memory-mapped I/O (e.g., observed by host 102 via polling, interrupt, or direct memory access), or similar technique. In at least one embodiment, completion mechanism 116 may also receive communications from hardware device 104 related to lock operations and release operations performed by hardware device 104.

In at least one embodiment, hardware device 104 includes a memory allocator 110. In at least one embodiment, memory allocator 110 includes a cache 120, a hash index calculator 118, and a slice controller 119. In at least one embodiment, cache 120 is configured to cache data structures 130 that, for example, include linked list structure 132, hash structure 134, and free list 136. Cache 120 may be L1, L2, L3, or other higher-level caches, or a combination thereof. Memory allocator 110 may receive a lock request or a release request. Upon the completion of the lock request or release request, memory allocator 110 may notify host 102

(e.g., via completion mechanism 116), including providing any results associated with the lock request or release request if applicable.

For each lock request or release request, memory allocator 110 may initiate one or more operations to perform the respective request. For example, memory allocator 110 may receive a request to lock or reserve a particular region of memory within cache 120. Locking the particular region of memory within the cache prevents other applications or processing from accessing (e.g., reading) and/or modifying (e.g., writing) the particular region of memory. The lock request may include a user tag. In at least one embodiment, the user tag may be an identifier of a user context. The user context may include contextual data that contains information regarding the current transaction. This information, for example, may include data such as the source and destination IP addresses, port numbers, protocol types, packet headers, and other metadata that can help identify the current network transaction. In one example, the user tag may be a message sequence number. A message sequence number is a unique identifier assigned to each message transmitted over a network. The message sequence number may include an incremented integer, or a timestamp included in a message header of the message. In another example, the user tag may be a queue pair (QP) number. A QP number is a unique identifier used to identify a specific communication channel between two nodes in a network.

Hash index calculator 118 may perform a hash operation on the user tag using a hash function to generate a hashed user tag. For example, hash index calculator 118 may perform a hash operation on the user tag using a Cyclic Redundancy Check (CRC) hash function. It is appreciated that the hash function may include, but is not limited to, SHA-612, MD5, RIPEMD-256, and the like. In another embodiment, hash index calculator 118 may perform the hash operation on the user tag using a controlled mask. For example, hash index calculator 118 may use a bitwise exclusive or (XOR) operation to perform the hash operation on the user tag.

Slice controller 119 is coupled to receive the hashed user tag from hash index calculator 118. Slice controller 119 may be implemented as a processor, a state machine, software, or any other implementation capable of performing the functions described herein. The received hashed user tag may correspond to an entry in hash structure 134. In at least one embodiment, each entry in hash structure 134 is a reference (e.g., a pointer) to a linked list stored within linked list structure 132. Slice controller 119 can cause memory allocator 110 to search the linked list corresponding to the hashed user tag to determine whether the received user tag is stored within the linked list. Responsive to determining that the user tag is not stored within the corresponding linked list (referred to as a "miss" herein), slice controller 119 can obtain a memory address from free list 136 to allocate memory for the user tag. Free list 136 can be a pool of unused memory addresses shared with multiple network transactions associated with system 100. Memory allocator 110 may allocate memory for user context 138 at a memory location corresponding to the obtained memory address within cache 120, and slice controller 119 may lock the memory location. Once the transaction has been completed, slice controller 119 may release the memory location and return the obtained memory address to the free list 136. Further details regarding memory allocation operations are described below with respect to FIG. 2.

In at least one embodiment, system 100 further includes an interconnect memory (ICM) 140 coupled to hardware device 104. The ICM 140 may be understood as a main memory of the hardware device 104, such as a dynamic random-access memory (DRAM) or the like. In at least one embodiment, ICM 140 may store data and routing information used for communication between network devices. For example, ICM 140 may store contextual data associated with the user context, such as packet headers, source and destination IP addresses, port numbers, protocol types, etc. In these embodiments, ICM 140 may be understood as a main memory of the hardware device 104, and cache 120 may be understood as a cache of ICM 140. In at least one embodiment, the set of data structures 130 is allocated within the ICM 140 but is cached within the set of data structures 130 on the cache 120.

Figure 2:
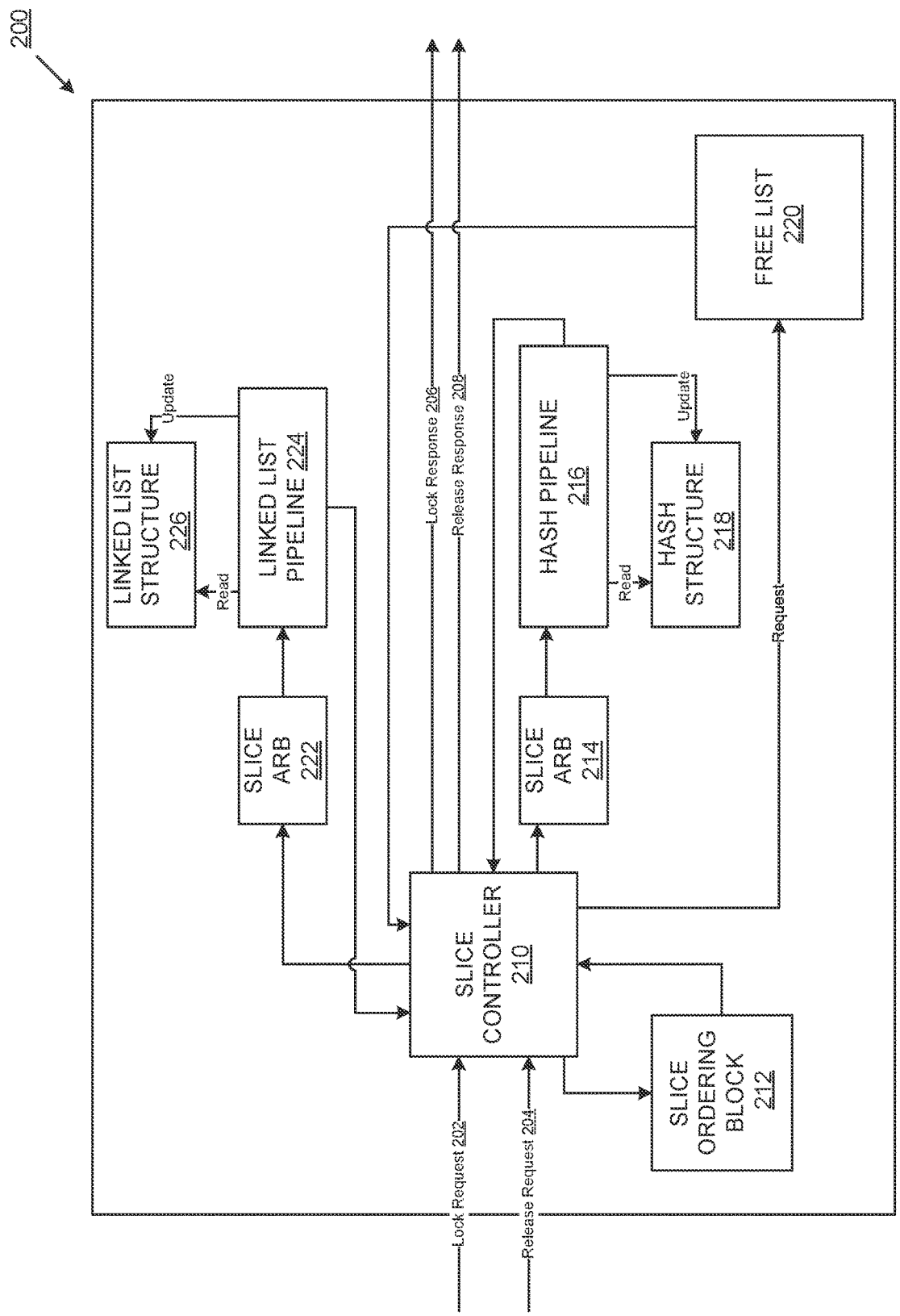
FIG. 2 is a block diagram of an implementation of a memory allocator, in accordance with at least one embodiment of the present disclosure.

FIG. 2 is a block diagram of an implementation of a memory allocator 200, in accordance with some embodiments of the present disclosure. Illustrated is a memory allocator 200 including a slice controller 210, a slice ordering block 212, a slice arbitration block 214, a hash pipeline 216, a hash structure 218, a free list 220, a slice arbitration block 222, a linked list pipeline 224, and a linked list structure 226. In at least one embodiment, hash structure 218 may correspond to hash structure 134 of FIG. 1, linked list structure 226 may correspond to linked list structure 132 of FIG. 1, and free list 220 may correspond to free list 136 of FIG. 1. Slice controller 210 is to receive a lock request 202 to lock or reserve a particular region of memory within a cache (e.g., cache 120) corresponding to a hardware device (e.g., a NIC, a DPU, etc.). In at least one embodiment, slice controller 210 may additionally receive a hash of a user tag. In at least one embodiment, the user tag may be an identifier of a user context, including contextual data that contains information regarding the current network transaction, as described above with respect to FIG. 1.

Slice controller 210 is a network function responsible for managing network slices. Specifically, slice controller 210 is controller logic configured to execute network functions described herein. For example, slice controller 210 may be configured to allocate network resources for lock request 202. Slice controller 210 may be implemented as a processor, a state machine, software, or any other implementation capable of performing the functions described herein. For example, slice controller 210 may be a finite state machine (FSM) to manage operation flow. In such an example, slice controller 210 may be in an idle state awaiting to receive lock request 202. In at least one embodiment, lock request 202 includes a user tag and a hash of the user. The user tag may be an identifier of a user context associated with a network transaction. The user context may, for example, include data (e.g., contextual data) associated with the current network transaction, as described above. Responsive to receiving lock request 202, slice controller 210 may transmit a request to slice arbitration block 214 to arbitrate entry to hash pipeline 216. Slice arbitration block 214 is configured to fairly select a slice to proceed to hash pipeline 216. Slice arbitration block 214 may ensure that each slice is processed in a fair and efficient manner. Slice arbitration mechanisms may include round-robin arbitration, priority-based arbitration, weighted-fair queuing, and the like.

Hash pipeline 216 is coupled to receive the hashed user tag and the user tag from slice arbitration block 214. In at least one embodiment, the hashed user tag corresponds to an index or an entry within hash structure 218. In at least one embodiment, each hashed user tag stored within hash structure 218 may be a reference (e.g., a pointer) to a linked list stored within linked list structure 226. Hash pipeline 216 may perform a read operation on hash structure 218 to determine whether the hash structure 218 includes a reference (e.g., a pointer) to a linked list within the linked list structure 226 or not (e.g., a NULL pointer). Responsive to determining that the entry in the hash structure 218 corresponding to the hashed user tag does not contain a reference to a linked list within eh linked list structure 226, hash pipeline 216 may provide an indication to slice controller 210 to retrieve a memory address from the free list 220 to allocate memory for the user tag. Responsive to determining that the entry in the hash structure 218 corresponding to the hashed user tag contains a reference (e.g., a pointer) to a linked list stored within the linked list structure 226, hash pipeline 216 may provide an indication to slice controller 210 to enter linked list pipeline 224.

Responsive to hash pipeline 216 determining that the entry in the hash structure 218 corresponding to the hashed user tag contains a reference to a linked list stored within the linked list structure 226, slice controller 210 may transmit a request to slice arbitration block 222 to arbitrate entry to linked list pipeline 224. Slice arbitration block 222 may ensure that each slice is processed in a fair and efficient manner. Slice arbitration mechanisms may include round-robin arbitration, priority-based arbitration, weighted-fair queuing, and the like.

Linked list pipeline 224 is coupled to receive lock request 202, the user tag, and the hashed user tag from slice controller 210 through arbitration block 222. The hashed user tag may identify an entry within the hash structure 218 that contains a reference to a head (i.e., a first entry) of a linked list within linked list structure 226, as described above. Each entry of the referenced linked list within linked list structure 226 may include one or more user tags and corresponding valid bits associated with referenced user contexts. For example, each entry of the identified linked list may include two user tags and respective valid bits, as illustrated with respect to FIG. 3. Each user tag stored within a linked list of linked list structure 320 may include a reference to one or more user contexts. For example, each user tag stored within a linked list of linked list structure 320 may include references to four separate user contexts and corresponding valid bits, as described with respect to FIG. 4. It is appreciated that a user tag may be associated with a different number of valid bits and corresponding user contexts without deviating from the scope of the present disclosure. Linked list pipeline 224 may traverse the identified linked list to determine whether the user tag associated with lock request 202 is included in the identified linked list.

Responsive to determining the user tag is included in the identified linked list (i.e., a "hit"), linked list pipeline 224 may return a reference (e.g., a pointer) to a memory location of a user context associated with the user tag. In at least one embodiment, lock request 202 may include an indication to "allocate on miss." In such an embodiment, responsive to determining the user tag is not included in the identified linked list (i.e., a "miss"), slice controller 210 may obtain a memory address from free list 220. Free list 220 can be a global pool of unused memory addresses shared with all possible network transactions. In at least one embodiment, free list 220 is a last-in, first-out (LIFO) data structure, as described with respect to FIG. 3. Slice controller 210 may allocate memory for the user tag and associated user context at a memory location corresponding to the memory address obtained from free list 220. In at least one embodiment, slice controller 210 may automatically allocate on miss without requiring an indication from lock request 202 to allocate on miss. Additionally, linked list pipeline 224 may update an entry of the identified linked list to include the user tag and may raise (e.g., write to "1") a corresponding valid bit to indicate that the user context is valid, as illustrated with respect to FIG. 3.

In some embodiments, each linked list entry may include more than one user tag and corresponding valid bit. For example, each entry of the identified linked list may include two user tags and respective valid bits. In such, an embodiment, responsive to determining the user tag is not included in the identified linked list (i.e., a "miss"), slice controller 210 may determine whether there is free space within an entry of the identified linked list to store the user tag prior to obtaining a memory address from the free list 220. For example, linked list pipeline 224 may identify an entry within the identified linked list containing only one of a possible two user tags. Accordingly, linked list pipeline 224 may update the identified entry of the identified linked list to include the user tag and may raise a corresponding valid bit to indicate that the user context is valid. Responsive to a determination that there is no free space within any entries of the identified linked list to store the user tag, linked list pipeline 224 may obtain a memory from free list 220 and allocate memory for the user tag at a memory location corresponding to the obtained memory address, as described above.

In at least one embodiment, if lock request 202 specifies to allocate on miss, prior to processing lock request 202 through slice arbitration block 214 and slice arbitration block 214, slice controller 210 may speculatively transmit a request to free list 220 to obtain a memory address from free list 220. Free list 220 may provide an unused memory address to slice controller 210. If linked list pipeline 224 determines the user tag is not included in linked list structure 226, slice controller 210 may allocate memory for the user tag at a memory location corresponding to the obtained memory address. If the user tag is already included in the identified linked list, slice controller 210 may return the obtained memory address back to free list 220.

In at least one embodiment, slice controller 210 may additionally include a mutual exclusion (MUTEX) to prevent more than one slice or more than one lock request from accessing the same linked list. A mutex is a type of lock that prevents multiple threads or processes from sharing the same resource. For example, the mutex may lock the identified linked list within the linked list structure 226 or linked list entry associated with lock request 202. The lock may prevent a subsequent lock request from accessing and/or writing to the identified linked list until slice controller 210 releases the lock. It is appreciated that slice controller 210 may implement the locking mechanism using another method, such as semaphores, without deviating from the scope of the present disclosure. In at least one embodiment, slice ordering block 212 may implement the lock and/or release mechanisms described above. In at least one embodiment, slice ordering block 212 may determine an order in which individual slices are organized during transmission and/or storage.

Responsive to completing the above-described memory allocation operations and locking operating, slice controller 210 may transmit (e.g., to host 102) a lock response 206. In at least one embodiment, lock response 206 may include a reference (e.g., pointer) to a location in memory corresponding to the user context of the user tag. The reference may be a memory address with a linked list entry address that identifies the linked list entry where the user tag is stored. In at least one embodiment, the identified linked list entry may include more than one user tag. For example, the identified linked list entry may include two user tags, as illustrated with respect to FIG. 4. In such an example, the returned memory address may include a user tag offset that identifies a location of the user tag stored within the identified linked list entry. In still another embodiment, the identified user tag may reference more than one user context. For example, the identified user tag may reference four user contexts, as illustrated with respect to FIG. 4. In such an example, the returned memory address may include a user context offset that identifies one of the four user contexts corresponding to the requested user context.

Slice controller 210 may be coupled to receive a release request 204 to release memory associated with lock request 202. In at least one embodiment, release request 204 may include a hashed user tag that is the same as the hashed user tag corresponding to lock request 202. Responsive to receiving release request 204, slice controller 210 may transmit a request to slice arbitration block 214 to allocate network resources for processing release request 204 and performing operations with respect to hash pipeline 216. Hash pipeline 216 may perform a read operation on hash structure 218 to locate the hashed user tag. As described above, each hashed user tag stored within hash structure 218 may be a reference or a pointer to a head (i.e., a first entry) of a linked list stored within linked list structure 226. Responsive to determining hash structure 218 contains the received hashed user tag, hash pipeline 216 may provide an indication to slice controller 210 to enter linked list pipeline 224.

Slice controller 210 may be coupled to receive the indication from hash pipeline 216 to enter linked list pipeline 224. Responsive to receiving the indication, slice controller 210 may transmit a request to slice arbitration block 222 to allocate network resources for processing release request 204 and performing operations with respect to linked list pipeline 224. Linked list pipeline 224 is coupled to receive a hashed user tag corresponding to release request 204 from slice controller 210. Linked list pipeline 224 may perform a read operation on linked list structure 226 to identify a linked list associated with the hashed user tag. The hashed user tag may correspond to the head (i.e., the first entry) of the identified linked list. Linked list pipeline 224 may traverse the identified linked list to locate an entry of the linked list corresponding to the user tag. The user tag may reference a user context. Linked list pipeline 224 may lower (i.e., mark as invalid) a valid bit of reference user context. In at least one embodiment, linked list pipeline may remove the user tag from the identified linked list and rearrange the identified linked list, as described in detail with respect to FIG. 3. Slice controller 210 may release the lock placed on the identified linked list and/or linked list entry to enable subsequent lock requests to access and write to the identified linked list. Slice controller 210 may further release and clear memory regions associated with the memory address allocated for the user tag and the user context. Clearing the memory region may involve, for example, overwriting the memory region with a predefined (e.g., all zeros) or random data, prior to assigning the memory address to a subsequent user context. Additionally, slice controller 210 may return the memory address previously allocated for the user tag and the user context back to free list 220 for reuse by subsequent network transactions. Slice controller 210 may transmit a release response 208 indicating that the release operation has been completed.

Figure 3:
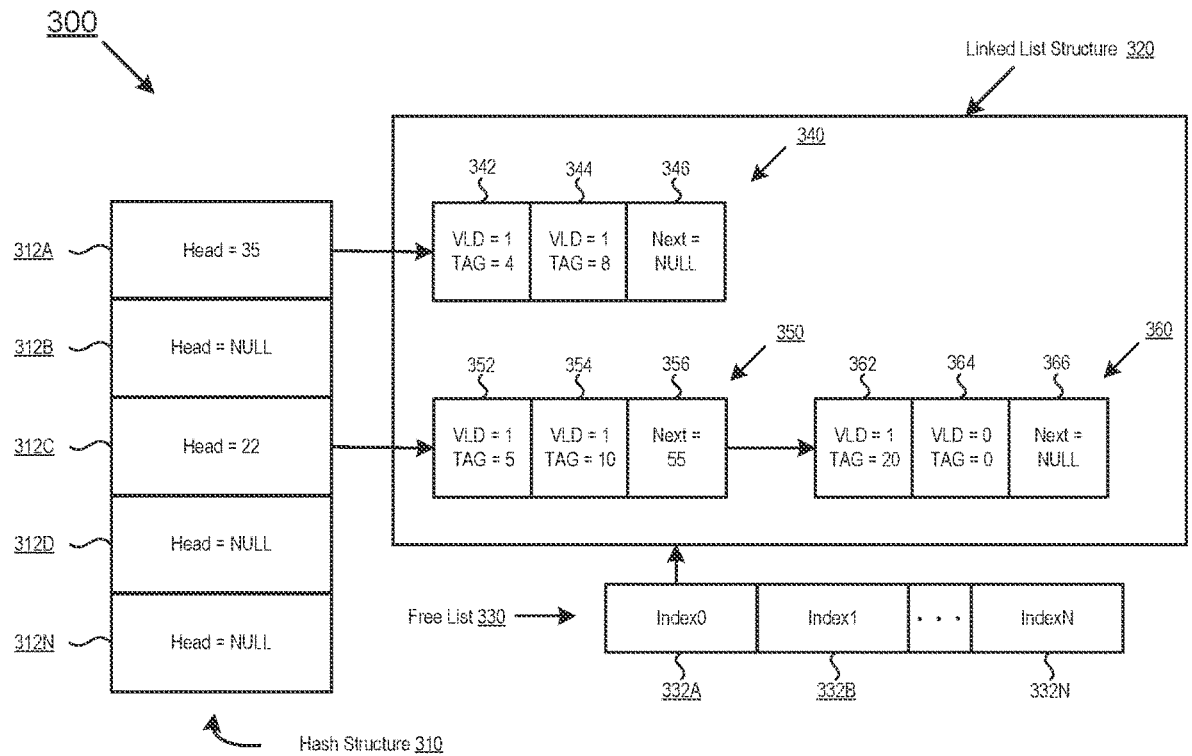
FIG. 3 illustrates an example of a memory diagram of a set of data structures including a hash structure, a linked list structure, and a free list, in accordance with at least one embodiment of the present disclosure.

FIG. 3 illustrates a memory diagram of a set of data structures 300 including a hash structure 310, a linked list structure 320, and a free list 330, according to at least one embodiment of the present disclosure. In at least one embodiment, the set of data structures 300 are stored within a cache (e.g., cache 120) of a network device (e.g., hardware device 104). When a memory allocator (e.g., memory allocator 110) fetches or receives a lock request from a host (e.g., host 102), the memory allocator may utilize the set of data structures 300 to allocate memory for a user context associated with the lock request. The lock request may include a user tag that is an identifier of the user context, as described in detail above. A hash function may be performed on the user tag to generate a hashed user tag that may be stored in hash structure 310.

Hash structure 310 is an example configuration of hash structure 134, described with respect to FIG. 1, and/or hash structure 218, described with respect to FIG. 2. Hash structure 310 includes multiple hash structure entries 312A through 312N (referred to generally as "hash entries 312" herein). Some hash entries 312 may include a hashed user tag that is a reference or a pointer to a head (i.e., first entry) of a linked list stored within linked list structure 320. Other hash entries 312 may include a NULL pointer (i.e., an empty hash entry). As illustrated, hash entry 312A points to entry 340 of a first linked list within linked list structure 320, hash entry 312B is a null pointer, hash entry 312C points to entry 350 of a second linked list within linked list structure 320, hash entry 312D is a null pointer, and hash entry 312N is a null pointer.

Linked list structure 320 is an example configuration of linked list structure 132, described with respect to FIG. 1, and/or linked list structure 226, described with respect to FIG. 2. Each linked list stored within linked list structure 320 may include one or more entries where each entry may include elements for two user tags and a reference to the next entry in the respective linked list. For example, the illustrated linked list structure 320 includes a first linked list with an entry 340. The entry 340 includes user tag 342, user tag 344, and a reference 346 to null, indicating the end of the first linked list. Linked list structure 320 further includes a second linked list with an entry 350 and an entry 360. The entry 350 includes user tag 352, user tag 354, and reference 356 to entry 360. Entry 360 includes a user tag 362, a user tag 364, and a reference 366 to null, indicating the end of the second linked list.

A memory allocator (e.g., memory allocator 110) may receive a user tag and a hashed user tag and identify a linked list within linked list structure 320 corresponding to the hashed user tag of a received lock request. For example, the memory allocator may determine that the received hashed user tag corresponds to entry 312A of hash structure 310. The memory allocator may traverse the linked list referenced by the received hashed user tag. For example, entry 312A of hash structure 310 references the head (entry 340) of the first linked list. Accordingly, the memory allocator may traverse the first linked list to locate the received user tag. In one example, the memory allocator may determine that the received user tag is neither user tag 342 nor user tag 344. Accordingly, the memory allocator may add the received user tag to the first linked list. Memory allocator may update reference 346 to reference the received user tag and raise (i.e., set to "1") a valid bit associated with the user tag to indicate that the received user tag is valid. Additionally, the memory allocator may retrieve a memory address from free list 330 and allocate memory for the received user tag and associated user context at the retrieved memory address.

In at least one embodiment, responsive to a user tag being removed from an entry of a linked list stored within linked list structure 320, the linked list structure may be rearranged (e.g., by memory allocator 200) to ensure continuity of the linked list. For example, the memory allocator can receive a request to release and deallocate a user context associated with user tag 362. The memory allocator traverses the second linked list to locate user tag 362 at entry 360. lowers (i.e., set from "1" to "0") the valid bit, and returns a memory address previously allocated for user tag 362 back to free list 330. Memory allocator can further determine that the user tag 364 is also invalid (i.e., the valid bit is "0"). Because both user tags stored at entry 360 of the second linked list are invalid, memory allocator removes entry 360 from the second linked list and rearranges the second linked list. To rearrange the second linked list, the memory allocator updates reference 356 to null.

Free list 330 can be a queue of unused memory addresses shared between all possible network transactions associated with the memory allocator. In at least one embodiment, free list 330 is a last-in, first-out (LIFO) data structure where the newest (last) index of the queue is processed first. As illustrated, Free list 330 includes multiple indices 332A through 332N corresponding to unused memory addresses. When memory allocator 200 allocates memory for a user context, the newest index (index 332A) is popped from free list 330 and provided to the memory allocator. When the memory allocator deallocates memory for a user context, the associated memory address is pushed back onto free list 330. Because free list 330 is a LIFO queue of unused memory addresses, the same memory addresses will be popped from the queue and pushed onto the queue as memory allocator 200 processes multiple lock requests and release requests. This memory address reuse can help reduce memory fragmentation and improve memory utilization. By avoiding the creation of new memory blocks every time a user context is added to the cache, the cache can make more efficient use of available memory, leading to faster overall performance.

Figure 4:
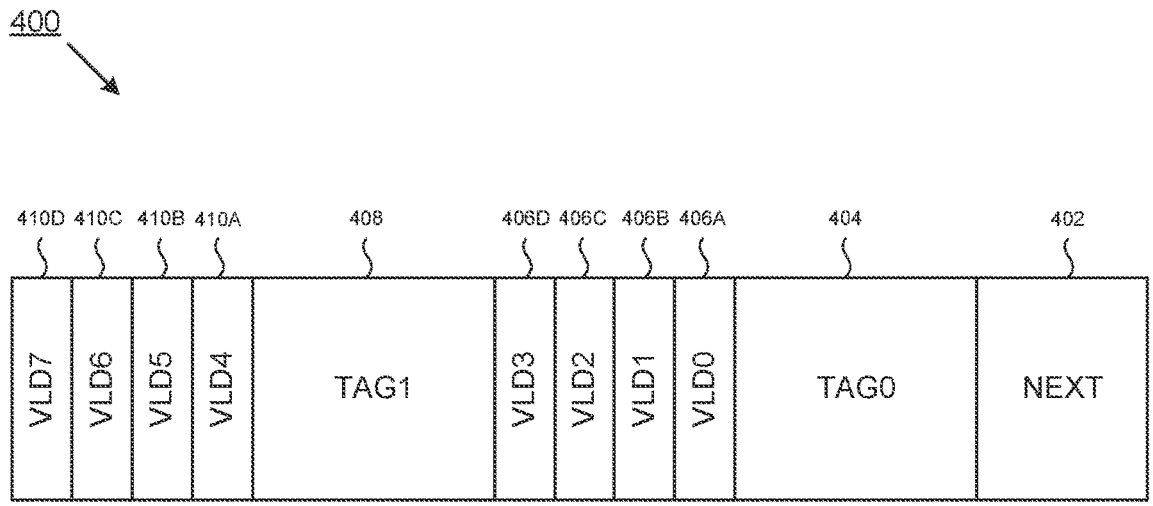
FIG. 4 illustrates an example of a diagram of a linked list entry, in accordance with at least one embodiment of the present disclosure.

FIG. 4 illustrates a diagram of a linked list entry, according to at least one
embodiment of the present disclosure. Linked list entry 400 is an example configuration of a linked list entry that includes two user tags and eight valid bits, where each valid bit is associated with a user context. Linked list entry 400 includes user tag 404 and a user tag 408. User tag 404 corresponds to valid bits 406A through 406D. User tag 408 corresponds to valid bits 410A through 410D. Linked list entry 400 further includes a reference 402 to the next linked list entry.

Responsive to completing memory allocation operations and locking operations associated with a user context, memory allocator 200 may return a reference (e.g., a memory address or a pointer) of the associated user context to the host. For example, the memory allocator may return a memory address corresponding to a user context associated with valid bit 406A of user tag 404. In such an example, the memory address includes a linked list entry address that identifies linked list entry 400. The memory address further includes a user tag offset that identifies user tag 404. The memory address further includes a user context offset that identifies user context associated with valid bit 406A.

Figure 5A:
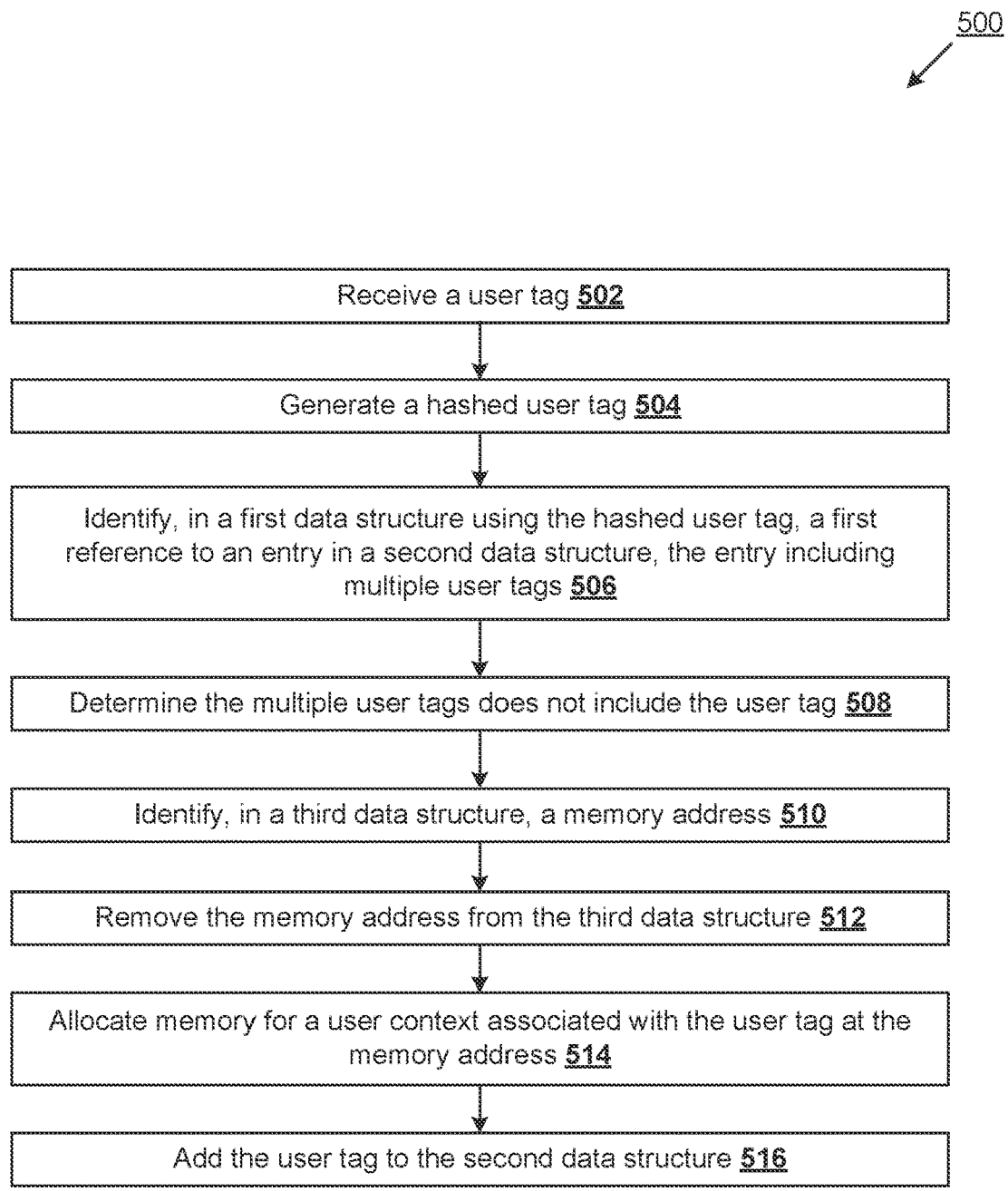
FIG. 5A depicts a flow diagram of an example method of dynamic memory allocation using a shared free list, in accordance with at least one embodiment of the present disclosure.

FIG. 5A depicts a flow diagram of an example method for dynamic memory allocation using a shared free list. The method 500 can be performed using controller logic that can include hardware (e.g., a processing device, processing circuitry, dedicated logic, microcode, hardware of a device, integrated circuit, etc.), software (e.g., instructions running or executing on a processing device), firmware, or a combination thereof. In at least one embodiment, the method 500 can be performed by a non-transitory computer-readable medium comprising instructions that, responsive to execution by a processor, cause the processor of a computing system to perform operations described herein. In one embodiment, method 500 can be performed by one or more components of a system, such as system 100 of FIG. 1. In one embodiment, one or more operations of method 500 may be performed by memory allocator 110 of hardware device 104. In other or similar embodiments, one or more operations of method 500 may be performed by memory allocator 200 of FIG. 2. In some implementations, one or more operations of method 500 can be performed by one or more other machines not depicted in the figures.

For simplicity of explanation, the methods are depicted and described as a series of acts. However, acts in accordance with this disclosure may occur in various orders and/or concurrently and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 502 of method 500, controller logic receives a user tag. In at least one embodiment, the user tag can be an identifier of a user context associated, for example, with a network transaction, as described above.

At block 504, controller logic generates a hashed user tag. Controller logic may perform a hash operation on the user tag to generate the hashed user tag. It is appreciated that controller logic may use a controlled mask, a CRC function, or other hash function described above, without deviating from the scope of the present disclosure.

At block 506, controller logic identifies, in a first data structure (e.g., hash structure 310) using the hashed user tag, a first reference to an entry in a second structure (e.g., linked list structure 320), the entry including multiple user tags. In at least one embodiment, the entry in the second data structure is a linked list. In at least one embodiment, the entry in the second data structure further includes multiple valid bits corresponding to the multiple user tags.

At block 508, controller logic determines the multiple user tags does not include the user tag.

At block 510, controller logic identifies, in a third data structure (e.g., free list 330), a memory address. The third data structure can be a pool of unused memory addresses shared with multiple network transactions. In at least one embodiment, the third data structure is a last-in, first-out (LIFO) queue.

At block 512, controller logic removes the memory address from the third data structure.

At block 514, controller logic allocates memory for a user context associated with the user tag at the memory address.

At block 516, controller logic adds the second user tag to the second data structure.

In at least one embodiment, controller logic may additionally lock the memory address and return a second reference to the memory address. In at least one embodiment, controller logic may receive a request to release the user tag and associated user context. Responsive to receiving the request to release the user tag, controller logic can deallocate memory for the user context associated with the user tag at the memory address, add the memory address to the third data structure, and release the memory address. In at least one embodiment, controller logic can further remove the user tag from the entry in the second data structure and rearrange the second data structure.

Figure 5B:
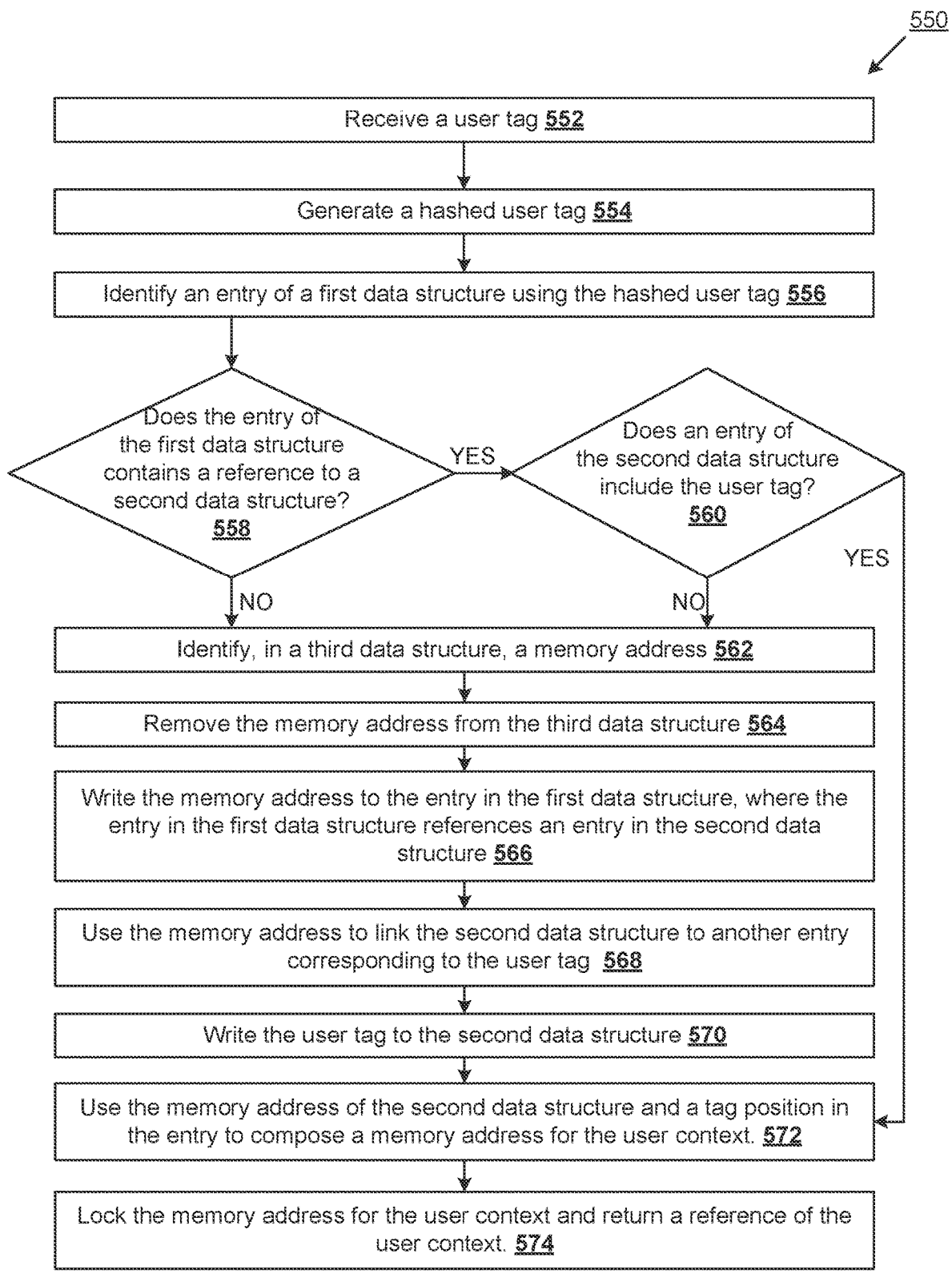
FIG. 5B depicts a flow diagram of an example method for dynamic memory allocation using a shared free list, in accordance with at least one embodiment of the present disclosure.

FIG. 5B depicts a flow diagram of an example method for dynamic memory allocation using a shared free list. The method 550 can be performed using controller logic that can include hardware (e.g., a processing device, processing circuitry, dedicated logic, microcode, hardware of a device, integrated circuit, etc.), software (e.g., instructions running or executing on a processing device), firmware, or a combination thereof. In at least one embodiment, the method 550 can be performed by a non-transitory computer-readable medium comprising instructions that, responsive to execution by a processor, cause the processor of a computing system to perform operations described herein. In one embodiment, method 550 can be performed by one or more components of a system, such as system 100 of FIG. 1. In one embodiment, one or more operations of method 550 may be performed by memory allocator 110 of hardware device 104. In other or similar embodiments, one or more operations of method 550 may be performed by memory allocator 200 of FIG. 2. In some implementations, one or more operations of method 550 can be performed by one or more other machines not depicted in the figures.

For simplicity of explanation, the methods are depicted and described as a series of acts. However, acts in accordance with this disclosure may occur in various orders and/or concurrently and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 552 of method 550, controller logic receives a user tag. In at least one embodiment, the user tag can be an identifier of a user context associated, for example, with a network transaction, as described above.

At block 554, controller logic generates a hashed user tag. Controller logic may perform a hash operation on the user tag to generate the hashed user tag. It is appreciated that controller logic may use a controlled mask, a CRC hash function, or an alternative hash function without deviating from the scope of the present disclosure.

At block 556, controller logic identifies an entry of a first data structure (e.g., hash structure 310) using the hashed user tag.

At block 558, controller logic determines whether the entry of the first data structure contains a reference to a second data structure (e.g., linked list structure 320). Responsive to determining the entry of the first data structure contains a reference to the second data structure, method 550 continues to block 560. Responsive to determining the entry of the first data structure does not contain a reference to the second data structure, method 550 continues to block 562.

At block 560, controller logic determines whether an entry of the second data structure includes the user tag. Responsive to determining an entry of the second data structure includes the user tag, method 550 continues to block 572. Responsive to determining an entry of the second data structure does not include the user tag, method 550 continues to block 562.

At block 562, controller logic identifies, in a third data structure (e.g., free list 330, a memory address.

At block 564, controller logic removes the memory address from the third data structure.

At block 566, controller logic writes the memory address to the entry in the first data structure, where the entry in the first data structure references an entry in the second data structure.

At block 568, processing logic uses the memory address to link the second data structure to another entry corresponding to the user tag.

At block 570, processing logic writes the user tag to the second data structure.

At block 572, processing logic uses the memory address of the second data structure and a tag position in the entry to compose a memory address for the user context.

At block 574, processing logic locks the memory address for the user context and returns a reference of the user context.

Figure 6:
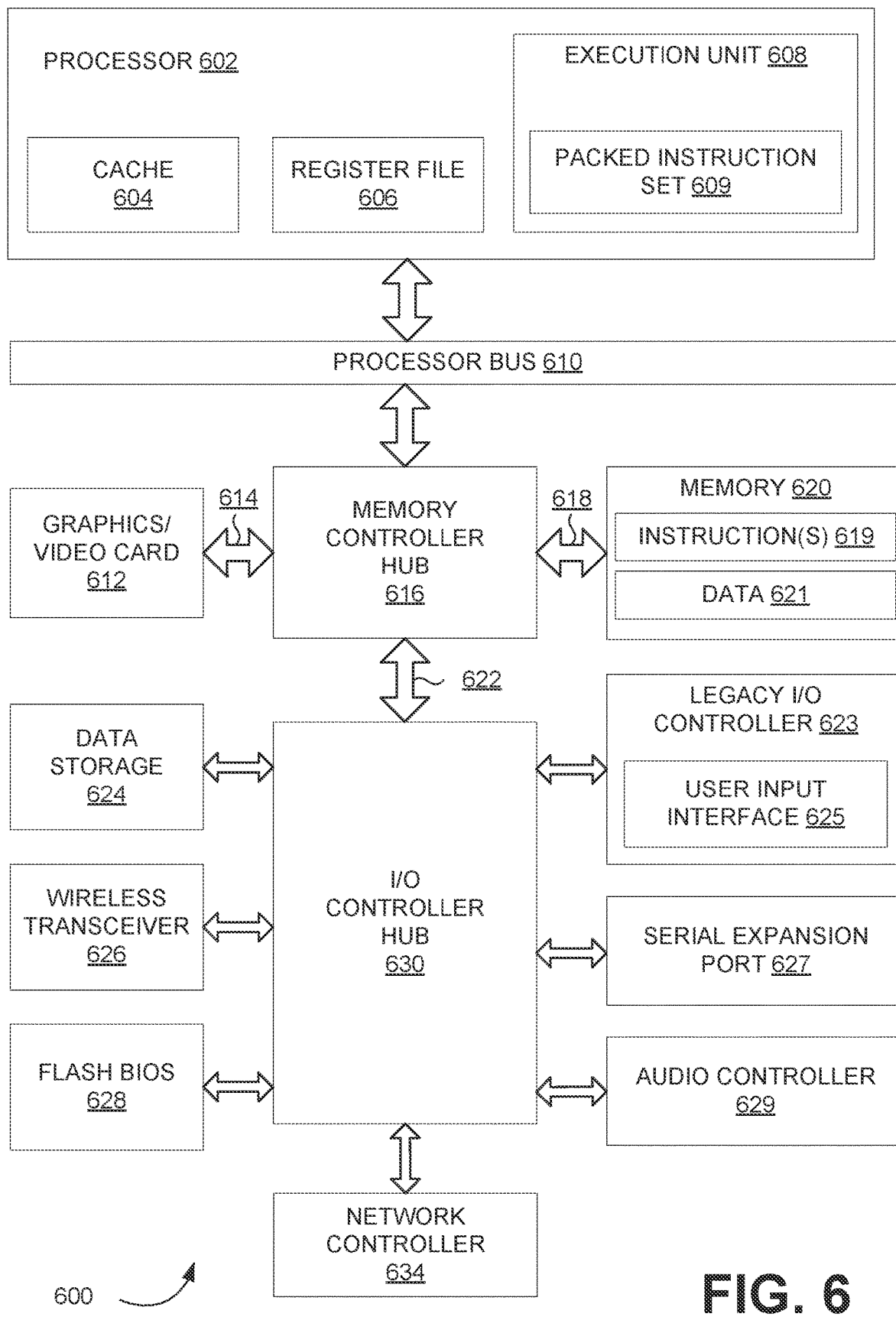
FIG. 6 is a block diagram illustrating a computer system, in accordance with at least one embodiment of the present disclosure.

FIG. 6 is a block diagram illustrating an example computer system 600 in accordance with at least some embodiments. In at least one embodiment, computer system 600 may be a system with interconnected devices and components, a System-on-Chip (SoC), or some combination. In at least one embodiment, computer system 600 is formed with a processor 602 that may include execution units to execute an instruction. In at least one embodiment, computer system 600 may include, without limitation, a component, such as a processor 602, to employ execution units including logic to perform algorithms for processing data. In at least one embodiment, computer system 600 may include processors, such as PENTIUM® Processor family, Xcon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 600 may be used in other devices, such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphic processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 608 that may be configured to process lock requests and release requests and/or perform dynamic memory allocation using a shared free list, according to techniques described herein. In at least one embodiment, computer system 600 is a single-processor desktop or server system. In at least one embodiment, computer system 600 may be a multiprocessor system. In at least one embodiment, processor 602 may include, without limitation, a complex instruction set computer (CISC) microprocessor, a reduced instruction set computer (RISC) microprocessor, a Very Long Instruction Word (VLIW) microprocessor, and a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, the cache memory may reside external to processor 602. In at least one embodiment, processor 602 may also include a combination of both internal and external caches. In at least one embodiment, a register file 606 may store different types of data in various registers, including integer registers, floating point registers, status registers, instruction pointer registers, or the like.

In at least one embodiment, execution unit 608, including, without limitation, logic to perform integer and floating-point operations, also resides in processor 602. Processor 602 may also include a microcode ("ucode") read-only memory ("ROM") that stores microcode for certain macro instructions. In at least one embodiment, execution unit 608 may include logic to handle a packed instruction set 609. In at least one embodiment, by including packed instruction set 609 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using the full width of a processor's data bus for performing operations on packed data, which may eliminate the need to transfer smaller units of data across a processor's data bus to perform one or more operations one data element at a time.

In at least one embodiment, execution unit 608 may also be used in microcontrollers, embedded processors, graphics devices, DSPs, and other types of logic circuits. In at least one embodiment, computer system 600 may include, without limitation, a memory 620. In at least one embodiment, memory 620 may be implemented as a dynamic random-access memory (DRAM) device, a static random-access memory (SRAM) device, a flash memory device, or other memory devices. Memory 620 may store instruction(s) 619 and/or data 621 represented by data signals that may be executed by processor 602.

In at least one embodiment, a system logic chip may be coupled to a processor bus 610 and memory 620. In at least one embodiment, the system logic chip may include, without limitation, a memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data, and textures. In at least one embodiment, MCH 616 may direct data signals between processor 602, memory 620, and other components in computer system 600 and may bridge data signals between processor bus 610, memory 620, and a system I/O 622. In at least one embodiment, a system logic chip may provide a graphics port for coupling to a graphics controller. In at least one embodiment, MCH 616 may be coupled to memory 620 through a high-bandwidth memory path 618, and graphics/video card 612 may be coupled to MCH 616 through an Accelerated Graphics Port ("AGP") interconnect 614.

In at least one embodiment, computer system 600 may use system I/O 622, which can be a proprietary hub interface bus to couple MCH 616 to I/O controller hub ("ICH") 630. In at least one embodiment, ICH 630 may provide direct connections to some I/O devices via a local I/O bus. In at least one embodiment, a local I/O bus may include, without limitation, a high-speed I/O bus for connecting peripherals to memory 620, a chipset, and processor 602. Examples may include, without limitation, an audio controller 629, a firmware hub ("flash BIOS") 628, a wireless transceiver 626, a data storage 624, a legacy I/O controller 623 containing a user input interface 625, a keyboard interface, a serial expansion port 627, such as a USB port, and a network controller 634, which may include in at least one embodiment, a data processing unit. Data storage 624 may comprise a hard disk drive, a floppy disk drive, a CD-ROM device, a flash memory device, or other mass storage devices.

In at least one embodiment, FIG. 6 illustrates a computer system 600, which includes interconnected hardware devices or "chips." In at least one embodiment, FIG. 6 may illustrate an example SoC. In at least one embodiment, devices illustrated in FIG. 6 may be interconnected with proprietary interconnects, standardized interconnects (e.g., Peripheral Component Interconnect Express (PCIe), or some combination thereof. In at least one embodiment, one or more components of computer system 600 are interconnected using compute express link ("CXL") interconnects.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range unless otherwise indicated herein, and each separate value is incorporated into the specification as if it were individually recited herein. In at least one embodiment, the use of the term "set" (e.g., "a set of items") or "subset." unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code, while multiple non-transitory computer-readable storage media collectively store all of the code. In at least one embodiment, executable instructions are executed such that different processors execute different instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout specification terms such as "processing," "computing," "calculating," "determining," or like, refer to actions and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or parallel. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality and are intended to be within the scope of this disclosure. Furthermore, although specific distributions of responsibilities may be defined above for purposes of description, various functions and responsibilities might be distributed and divided in different ways, depending on the circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A method comprising:
    determining a user tag and a user context associated with the user tag based on a network transaction, wherein the user context comprises at least part of the network transaction;
    generating a hashed user tag;
    identifying, in a first data structure using the hashed user tag, a first reference to an entry in a second data structure, the entry including a plurality of user tags;
    responsive to determining the plurality of user tags does not include the user tag:
       identifying, in a third data structure, a memory address;
       removing the memory address from the third data structure;
       allocating memory for the user context associated with the user tag at the memory address; and
       adding the user tag to the second data structure, wherein the user tag has an associated user tag offset and an associated user context offset, wherein the associated user tag offset indicates a first offset within the second data structure and the associated user context offset indicates a second offset within the second data structure.

2. The method of claim 1, further comprising:
    locking the memory address; and
    returning a second reference to the memory address, wherein the second reference comprises the user tag offset.

3. The method of claim 2, further comprising:
    receiving a request to release the user tag;
    deallocating memory for the user context associated with the user tag at the memory address;
    adding the memory address to the third data structure; and
    releasing the memory address.

4. The method of claim 3, further comprising:
    removing the user tag from the entry in the second data structure; and
    rearranging the second data structure.

5. The method of claim 1, wherein the second data structure is a linked list.

6. The method of claim 1, wherein the third data structure is a last-in, first-out queue.

7. The method of claim 1, wherein the entry in the second data structure further comprises a plurality of valid bits, wherein each of the plurality of user tags is associated with one or more of the plurality of valid bits.

8. A system comprising:
    a memory; and
    hardware controller logic coupled to the memory, to perform operations comprising:
       determining a user tag and a user context associated with the user tag based on a network transaction, wherein the user context comprises at least part of the network transaction;
       generating a hashed user tag;
       identifying, in a first data structure using the hashed user tag, a first reference to an entry in a second data structure, the entry including a plurality of user tags;
       responsive to determining the plurality of user tags does not include the user tag:
          identifying, in a third data structure, a memory address;
          removing the memory address from the third data structure;
          allocating memory for the user context associated with the user tag at the memory address; and
          adding the user tag to the second data structure, wherein the user tag has an associated user tag offset and an associated user context offset, wherein the associated user tag offset indicates a first offset within the second data structure and the associated user context offset indicates a second offset within the second data structure.

9. The system of claim 8, the operations further comprising:
    locking the memory address; and
    returning a second reference to the memory address, wherein the second reference comprises the user tag offset.

10. The system of claim 9, the operations further comprising:
    receiving a request to release the user tag;
    deallocating memory for the user context associated with the user tag at the memory address;
    adding the memory address to the third data structure; and
    releasing the memory address.

11. The system of claim 10, the operations further comprising:
    removing the user tag from the entry in the second data structure; and
    rearranging the second data structure.

12. The system of claim 8, wherein the second data structure is a linked list.

13. The system of claim 8, wherein the third data structure is a last-in, first-out queue.

14. The system of claim 8, wherein the entry in the second data structure further comprises a plurality of valid bits, wherein each of the plurality of user tags is associated with one or more of the plurality of valid bits.

15. A network interface controller coupled with a host, the network interface controller comprising processing circuitry to perform operations comprising:
    determining a user tag and a user context associated with the user tag based on a network transaction, wherein the user context comprises at least part of the network transaction;

generating a hashed user tag;
identifying, in a first data structure using the hashed user tag, a first reference to an entry in a second data structure, the entry including a plurality of user tags;
responsive to determining the plurality of user tags does not include the user tag:
 identifying, in a third data structure, a memory address;
 removing the memory address from the third data structure;
 allocating memory for the user context associated with the user tag at the memory address; and
 adding the user tag to the second data structure, wherein the user tag has an associated user tag offset and an associated user context offset, wherein the associated user tag offset indicates a first offset within the second data structure and the associated user context offset indicates a second offset within the second data structure.

16. The network interface controller of claim 15, the operations further comprising:
 locking the memory address; and
 returning a second reference to the memory address, wherein the second reference comprises the user tag offset.

17. The network interface controller of claim 16, the operations further comprising:
 receiving a request to release the user tag;
 deallocating memory for the user context associated with the user tag at the memory address;
 adding the memory address to the third data structure; and
 releasing the memory address.

18. The network interface controller of claim 17, the operations further comprising:
 removing the user tag from the entry in the second data structure; and
 rearranging the second data structure.

19. The network interface controller of claim 15, wherein the second data structure is a linked list.

20. The network interface controller of claim 15, wherein the third data structure is a last-in, first-out queue.

* * * * *